(12) United States Patent
Lewis et al.

(10) Patent No.: US 6,976,704 B2
(45) Date of Patent: Dec. 20, 2005

(54) ADAPTIVE OUTPUT AIRBAG INFLATION DEVICE

(75) Inventors: Robert E. Lewis, Hooper, UT (US); Mats Bohman, Layton, UT (US); William D. Staheli, North Ogden, UT (US); Steve Taylor, Sunset, UT (US)

(73) Assignee: Autoliv ASP, Inc., Ogden, UT (US)

( * ) Notice: Subject to any disclaimer, the term of this patent is extended or adjusted under 35 U.S.C. 154(b) by 144 days.

(21) Appl. No.: 10/354,323

(22) Filed: Jan. 30, 2003

(65) Prior Publication Data

US 2004/0124619 A1 Jul. 1, 2004

(51) Int. Cl.[7] .................................................. B60R 21/28
(52) U.S. Cl. ....................................................... 280/741
(58) Field of Search ................................ 280/741, 742, 280/740, 739

(56) References Cited

U.S. PATENT DOCUMENTS

| | | | |
|---|---|---|---|
| 3,721,456 A | 3/1973 | McDonald | |
| 3,758,131 A | 9/1973 | Stephenson et al. | |
| 4,358,998 A | 11/1982 | Schneiter et al. | |
| 4,950,458 A | 8/1990 | Cunningham | |
| 5,033,390 A | 7/1991 | Minert et al. | |
| 5,411,290 A | 5/1995 | Chan et al. | |
| 5,655,790 A | 8/1997 | Faigle et al. | |
| 5,794,973 A | 8/1998 | O'Loughlin et al. | |
| 6,032,979 A | 3/2000 | Mossi et al. | |
| 6,170,867 B1 | 1/2001 | Rink et al. | |
| 6,189,927 B1 | 2/2001 | Mossi et al. | |
| 6,314,889 B1 | 11/2001 | Smith | |
| 6,481,357 B1 * | 11/2002 | Lindner et al. | 102/530 |
| 6,607,214 B2 * | 8/2003 | Blakemore et al. | 280/741 |
| 6,616,183 B2 * | 9/2003 | Huber et al. | 280/736 |
| 2001/0026064 A1 | 10/2001 | Bergmann et al. | |

* cited by examiner

*Primary Examiner*—Faye M. Fleming
(74) *Attorney, Agent, or Firm*—Sally J. Brown (57) ABSTRACT

An airbag inflator is provided including a housing defining a storage chamber containing contents including a supply of a gas source material in a fluid form and a propagation member contained at least in part within the storage chamber and defining a propagation chamber having a volume containing a supply of a reactive material that reacts to at least produce heat. The propagation member having a first end and a second end and including a plurality of gas exit holes. A first initiator at the first end of the propagation member is in discharge communication with the supply of reactive material and effective to initiate the reactive material and a second initiator at the second end of the propagation member is in discharge communication with the supply of reactive material and effective to initiate the reactive material. At least one of the first and second initiators is actuated to produce a supply of inflation gas for inflating an airbag. The first and second initiator devices can be actuated substantially simultaneously or the second initiator can be actuated at a selected time interval subsequent to actuation of the first initiator, thereby providing various selected rates of inflation gas production.

22 Claims, 6 Drawing Sheets

ADAPTIVE OUTPUT AIRBAG INFLATION DEVICE

BACKGROUND OF THE INVENTION

This invention relates generally to inflation devices such as for the inflation of an airbag and, more particularly, to an airbag inflator that can supply or provide inflation gas at various quantities and/or selected or adaptive rates.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. The airbag cushion is designed to inflate into a location within the vehicle between the occupant and certain parts of the vehicle interior, such as the doors, steering wheel, instrument panel or the like, to prevent or avoid the occupant from forcibly striking such parts of the vehicle interior. Upon actuation of the system, the, cushion begins to be inflated or expanded, in a matter of no more than a few milliseconds, with gas produced or supplied by a device commonly referred to as an "inflator."

Various types of airbag inflator devices have been disclosed in the art for the inflation of airbag cushions such as used in inflatable restraint systems. One such inflator device, generally known as a hybrid airbag inflator or hybrid gas generator, uses high temperature reaction products, typically also including additional gas products, generated by the reaction of a reactive material, to increase the gas pressure within the inflator, rupturing a rupturable seal and inflating one or more airbag cushions. Such gas-filled hybrid inflators typically provide a relatively high airbag inflation rate. In some cases, the stored and pressurized gas may include or form an oxidizing gas to assist in more fully converting the reaction products generated by the reaction of the reactive material, to compounds such as carbon dioxide and water.

Often such inflator devices also include an initiator, such as a squib, and an igniter composition to actuate the reactive material. In practice, upon receipt of an appropriate triggering signal from a crash or deceleration sensor, the initiator activates causing the rapid combustion of the igniter composition, which in turn actuates the reactive material. The igniter composition may be incorporated in the initiator in various forms such as a granular material.

The size, shape, and components of airbag inflators can vary depending on the vehicle and where in the vehicle the airbag inflator is used, e.g., driver side or passenger-side. In addition, the size of the reactive material load contained within such an inflator structure is generally predetermined in order to be sufficient to result in desired inflation of the associated airbag cushion upon actuation of the inflator. As will be appreciated, the incorporation and use of a different sized inflator are often necessary to change or alter the inflation performance provided by the inflator system. Consequently, significant design changes may be required to permit the incorporation and use of such inflator system between applications requiring or desiring different inflation performances.

In view of possibly varying operating conditions and, in turn, possibly varying desired performance characteristics, there is a need and a desire to provide what has been termed an "adaptive" airbag inflator device and a corresponding inflatable restraint system. With an adaptive inflator, output parameters such as one or more of the quantity, supply and rate of production of inflation gas, for example, can be selectively and appropriately varied dependent on selected operating conditions such as ambient temperature, occupant presence or position, seat belt usage and rate of deceleration of the motor vehicle, for example.

Safety restraint airbag cushions are normally sized and shaped to provide a vehicle occupant with desired cushioning protection when such an airbag cushion has been properly deployed. In a typical airbag module assembly, an airbag cushion is normally stored within a reaction canister in an uninflated, folded condition. In practice, an airbag cushion for the protection of a front seat passenger in the event of a vehicular frontal impact is typically of a substantially larger size, e.g., larger volume, than a corresponding airbag cushion for the protection of the vehicle driver. Consequently, an inflator device associated with the inflation of a passenger airbag cushion must typically provide a substantially greater relative volume or amount of inflation gas in a timely and effective manner. However, passenger occupants typically do not maintain a relatively standard traveling position as do vehicle drivers. Due to the variations in passenger positions, it can be desirable that the passenger side airbag deploys at a slower initial rate followed by a subsequent increase in deployment rate. Therefore, the chance of injury due to an out-of-position occupant is decreased. This type of variation in deployment can be obtained through controlled inflation gas output, generally referred to as adaptive inflation gas output.

While such adaptive systems are desirable, they typically require the inclusion of additional components as a part of the associated inflator device. As will be appreciated, the inclusion of such additional components may undesirably increase one or more of the size, cost and weight of the inflator device. In view thereof, it has been difficult to provide an adaptive inflator, and particularly an adaptive hybrid inflator, which will satisfactorily meet the size, cost and weight limitations associated with modern vehicle design, particularly as it pertains to passenger side applications.

Thus, there is a need and a demand for an adaptive inflator device, and more particularly an adaptive hybrid inflator, of relatively simple design and construction and, in turn, comparatively, low or reduced cost. In particular, there is a need and a demand for such an adaptive inflator device which will meet the differing output requirements between various vehicles with a single design.

SUMMARY OF THE INVENTION

A general object of the invention is to provide an improved vehicular inflatable restraint system inflator device.

A more specific objective of the invention is to overcome one or more of the problems described above.

The general object of the invention can be attained, at least in part, through an airbag inflator including a housing. The housing defines a storage chamber that contains contents including a supply of a gas source material in a fluid form. A propagation member contained at least in part within the storage chamber defines a propagation chamber having a volume containing a supply of a reactive material that reacts to at least produce heat. The propagation member has a first end and a second end, and a plurality of gas exit holes. A first initiator at the first end of the propagation member is in discharge communication with the supply of reactive material and effective to initiate the reactive material. A second initiator at the second end of the propagation member is also in discharge communication with the supply of reactive material and effective to initiate the reactive material.

The prior art generally fails to disclose an adaptive airbag inflator or adaptive hybrid airbag inflator capable of producing varied inflation rates using a single propagation member and/or a single supply of a reactive material. The prior art also generally fails to disclose adaptive airbag inflators including more than one initiator at opposite ends of a single propagation member for actuating the supply of reactive material, particularly the same supply of reactive material.

The invention further comprehends a method of generating inflation gas via an airbag inflator. The airbag inflator includes a housing defining a storage chamber containing contents including a supply of a gas source material in a fluid form. A propagation member is contained at least in part within the storage chamber and defines a propagation chamber having a volume and containing a supply of a reactive material that reacts to at least produce heat. The propagation member has a first end and a second end and includes a plurality of gas exit holes. A discharge opening connects the storage chamber and an airbag and includes a rupturable seal normally sealing the storage chamber from the airbag and rupturable to at least in part release the contents of the storage chamber. A first initiator at the first end of the propagation member is in discharge communication with the supply of reactive material and effective to initiate the reactive material, and a second initiator at the second end of the propagation member is in discharge communication with the supply of reactive material and effective to initiate the reactive material. The method includes the step of actuating at least one of the first and second initiators. In one embodiment of this invention when both the first and second initiators are actuated, the first and second initiators are actuated substantially simultaneously. In another embodiment, the second initiator is actuated at a selected time interval subsequent to actuation of the first initiator.

Other objects and advantages will be apparent to those skilled in the art from the following detailed description taken in conjunction with the appended claims and drawings.

DETAILED DESCRIPTION OF THE INVENTION

The present invention provides an airbag inflator device, more particularly an adaptive output hybrid inflator device, that allows control over output parameters such as one or more of the quantity, supply and rate of production of inflation gas. As discussed above, these output parameters can be selectively and appropriately varied dependent on selected operating conditions such as ambient temperature, occupant presence, seat belt usage and rate of deceleration of the motor vehicle, for example. The control over the output parameters in turn provides control over the inflation rate of a corresponding airbag.

Figure 1:
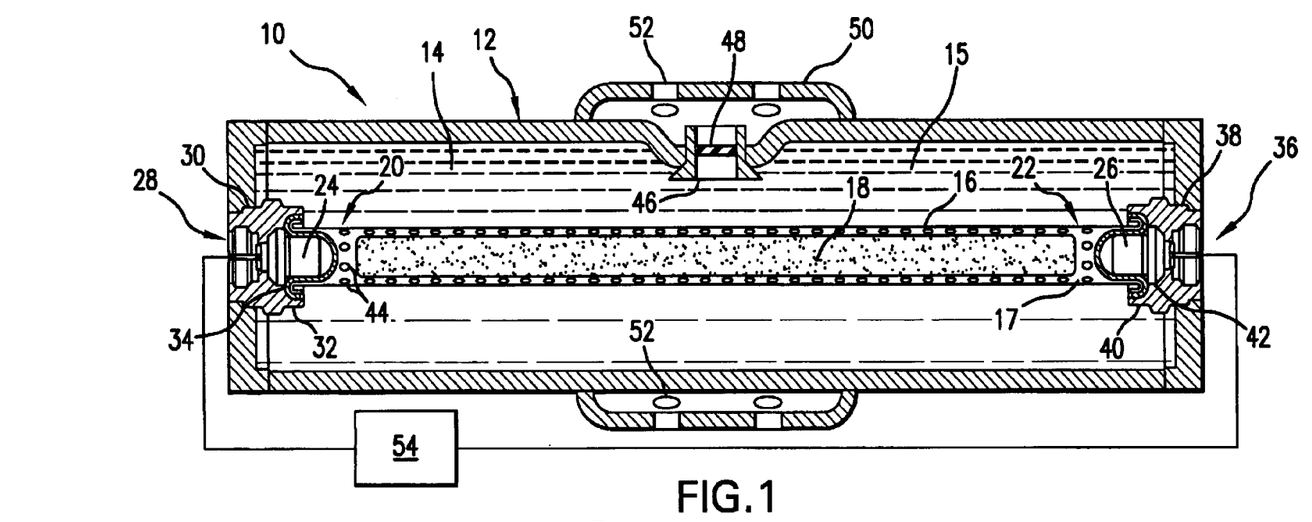
FIG. 1 is a partial cross-sectional side view of an airbag inflator and an associated control assembly in accordance with one embodiment of the invention.

FIG. 1 illustrates a hybrid airbag inflator in accordance with a one embodiment of the invention and generally designated with the reference numeral 10. The invention will be described hereinafter with particular reference to an inflatable restraint system installation for the protection of a front seat passenger in the event of a vehicular frontal impact. It will be understood by those skilled in the art and guided by the teachings herein provided that the invention has general applicability to inflatable restraint installations for various automotive vehicles including vans, pick-up trucks, and particularly automobiles.

FIG. 1 shows the airbag inflator 10 including a housing 12 defining a storage chamber 14. Contents of the storage chamber 14 include a supply of a gas source material 15. The gas source material is desirably in a fluid form. "Fluid form" refers to the gas source material 15 generally being a gas, liquid or combination thereof. As will be appreciated by one skilled in the art, the gas source material 15 can include various gas source materials known in the art, particularly those known for use in hybrid inflator assemblies. Suitable gas source materials for use in the practice of the invention include nitrous oxide as well as inert materials such as argon, helium and combinations thereof, for example. In accordance with one preferred embodiment of the invention, nitrous oxide is advantageously used as a gas source material as, for example, nitrous oxide may advantageously dissociate such as to produce additional moles of gas upon reaction. In accordance with one particularly preferred embodiment of the invention, a gas source material composed of a mixture of argon, nitrous oxide and helium, such as in a mixture composed 70 mole percent argon, 20 mole percent nitrous oxide and 10 mole percent helium, is used.

The storage chamber 14 contains a propagation member 16. The propagation member 16 defines a propagation chamber 17 having a volume containing a supply of a reactive material 18. In one embodiment of this invention the reactive material 18 is a pyrotechnic material. Those skilled in the art and guided by the teachings herein provided will appreciate that various pyrotechnic or propellant reactive materials can be advantageously employed in the practice of the invention. Further, those skilled in the art will also appreciate that such formulations can be appropriately adjusted or tuned, such as through the inclusion of an appropriately selected binder, to desirably adjust the burn rate of the reactive material.

The propagation member 16 has a first end 20 and a second end 22. The propagation member 16 shown in FIG. 1 is an elongated tube that extends the length of the storage chamber 14. As will be appreciated by one skilled in the art guided by the teachings herein provided, the propagation member can be various shapes and sizes depending on the shape of the housing and the amount of reactive material to be contained therewithin. Those skilled in the art and guided by the teachings herein provided will appreciate that the propagation member can be made from various materials and more typically be made of metal. In addition, as will be appreciated by one skilled in the art, the propagation member 16 can extend beyond the housing 12 with a portion not within the storage chamber 14.

A first initiator 24 is positioned at the first end 20 of the propagation member 16 in discharge communication with the supply of reactive material and effective to actuate the supply of reactive material 18. The first initiator 24 can initiate a portion of the supply of the reactive material 18 at the first end 20 of the propagation member 16. Upon initiation by the first initiator 24, the reaction of the supply of reactive material 18 propagates through the propagation member 16, in a fuse-like chain reaction, from the first end 20 toward the second end 22.

A second initiator 26 is positioned at the second end 22 of the propagation member 16, opposite the first end 20 and the first initiator 24, in discharge communication with the supply of reactive material 18 and effective to initiate the supply of reactive material 18. The second initiator 26 can initiate a portion of the supply of the reactive material 18 at the second end 22 of the propagation member 16. Upon initiation by the second initiator 26, the reaction of the reactive material 18 propagates through the propagation member 16, in a fuse-like chain reaction, from the second end 22 toward the first end 20. Thus, if the first initiator 24 and the second initiator 26 simultaneously initiate the reactive material 18 at the respective ends, the reactive material will propagate through the propagation member 16 by two separate reactions, from each of the first end 20 and the second end 22, respectively, until the two reactions meet at about the middle of the propagation member 16 and the supply of reactive material 18 has been fully reacted.

As will be appreciated by one skilled in the art, the first initiator 24 and the second initiator 26 can include various sizes and configurations as known in the art. In one embodiment of this invention, as shown in FIG. 1, the first initiator 24 is included in a first initiator assembly, generally designated by the reference numeral 28, that is mounted or mated to the housing 12 partially within the storage chamber 14 via a first mounting opening 30. The first initiator assembly 28 includes the first initiator 24, an initiator adapter or holder 32 whereby the first initiator assembly 28 is mounted to or mated with the housing 12 and an initiator seal 34, sealing the first initiator 24 with the adapter 32. The second initiator 26 desirably includes a similar configuration on the opposite side of the housing 12. In particular, the second initiator assembly 36 includes the second initiator 26, a second initiator adapter or holder 40 whereby the second initiator assembly 36 is mounted to or mated with the housing 12 and a second initiator seal 42, sealing the second initiator 26 with the adapter 40.

When initiated, the reaction of the supply of the reactive material 18 produces reaction products which contact the gas source material 15. The propagation member 16 includes a plurality of gas exit holes 44 that allow the reaction products produced by the reaction of the supply of reactive materials 18 to exit the propagation member 16 and contact the gas source material 15. The gas exit holes 44 are desirably appropriately sized, shaped, positioned and arranged to focus the reaction products resulting from reaction of the reactive material 18 into the bed of gas source material 15 contained within the storage chamber 14. As will be appreciated, the contact of the reaction products with the gas source material 15 can be, either or both, thermal or physical in nature. In one embodiment of this invention, the supply of reactive material 18 reacts to produce heat, although desirably it may also produce at least one gaseous species. Upon entering the storage chamber 14 with the gas source material 15, the reaction products cause an increase in a gas pressure within the storage chamber 14. The heat produced by the reaction of the supply of reactive material 18 initiates the gas source material 15 to produce or form a supply of inflation gas, thereby providing a means to inflate an airbag. Also, gases produced or formed by the reaction of the supply of reactive material 18, can provide additional pressure and inflation gas in the storage chamber 14.

The invention in its broader application is not limited to the use of particular or specific reactive materials. As those skilled in the art will appreciate, the invention can be practiced using a wide variety of reactive materials which meet flame temperature, stability, filterability, toxicity, corrosivity, and gas generation requirements. Differences in performance can be realized through the use of reactive materials of different composition. In addition, as will be appreciated, reactive materials, e.g., pyrotechnics, useful in the practice of the invention can take various appropriate desired forms, such as various extruded forms as well as granulated materials. For example, to provide a faster or more rapid reacting material it may be desirable to employ a form of the reactive material having an increased or greater surface area. The invention, in its broader practice, is not limited to particular or specific forms of reactive materials.

The airbag inflator 10 includes a control assembly 54, such as known in the art, in operational control communication with the first initiator 24 and second initiator 26. The control assembly 54 can provide a first reaction initiating signal to the first initiator 24 and a second reaction initiating signal to the second initiator 26 when the airbag is to be inflated, such as at the time of a vehicle crash or collision incident. The control assembly 54 provides control over the initiation of the supply of reactive material 18 by the first initiator 24 and/or the second initiator 26.

The housing 12 includes at least one discharge opening 46 for discharging inflation gas within the storage chamber 14 for inflation of an associated airbag cushion (not shown). Those skilled in the art and guided by the teachings herein provided will appreciate that the placement, positioning, and sizing of the discharge opening 46 can desirably be selected to provide or satisfy particular inflator performance criteria. For example, in accordance with a preferred embodiment of the invention and as shown in FIG. 1, the discharge opening 46 is centrally located on a side of the housing 12. The discharge opening 46 includes a rupturable seal 48. The rupturable seal 48 normally seals the storage chamber 14 from the airbag cushion, and it is rupturable to at least in part release the contents of the storage chamber 14. Increased pressure in the storage chamber 14, such as results from the contact of the reactive products and the gas source material 15, causes the rupture of the rupturable seal, thereby releasing the inflation gas into the airbag cushion. As discussed above, typically gas filled hybrid inflators that function with a rupturable seal provide a high airbag inflation rate. The controlled reactions provided by the inflators of this invention can provide a controlled, and possible slower production of inflation gas and therefore a controlled, and possible slower, airbag inflation rate.

As upon rupture of the rupturable seal 48, the so formed inflation gas can exit the storage chamber 14 under relatively high pressure. A thrust neutral diffuser element 50 is attached to the housing 12 surrounding the discharge opening 46. The thrust neutral diffuser element 50 assists in the proper directing and distribution of the inflation gas into the associated airbag cushion through a plurality of diffuser openings 52. The thrust neutral diffuser element 52 of the embodiment shown in FIG. 1, has the general form of a cylindrical sleeve that extends around the housing 12. The thrust neutral diffuser element 50 includes a plurality of diffuser openings 52 positioned around the housing 12, so that the thrust from the inflation gas exiting the discharge opening 46 is distributed around the housing 12 with the inflation gas exiting from the inflator 10 through the diffuser openings 52.

Those skilled in the art and guided by the teachings herein provided will appreciate that the structure, position, and size of the thrust neutral diffuser element, as well as the placement, positioning, and sizing of the diffuser openings, can desirably be selected to provide or satisfy particular inflator performance criteria. As will be appreciated by one skilled in the art, the inflators of this invention can also be practiced without a diffuser element.

Figure 2:
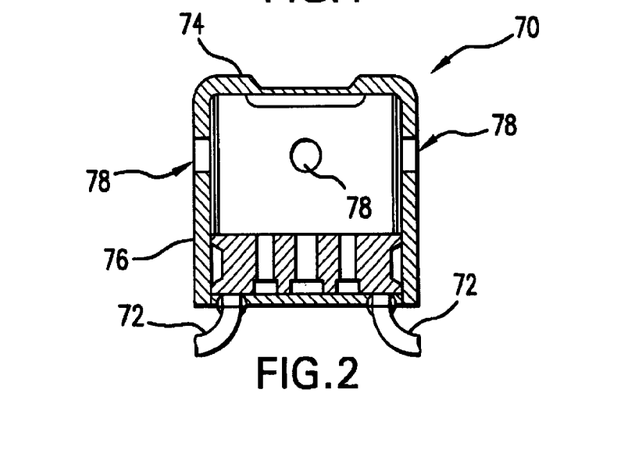
FIG. 2 is a cross-sectional fragmentary view showing a thrust neutral diffuser of an airbag inflator in accordance with another embodiment of this invention.

FIG. 2 illustrates another embodiment of a diffuser element 70 useful in this invention. The diffuser 70 is attached to the housing 72 and has the general form of an inverted bowl and includes a top portion 74 and a cylindrical sidewall 76. The sidewall 76 includes a plurality of spaced, preferably, generally spaced apart diffuser openings 78. As will be appreciated, the spacing of the diffuser openings, such as described above for FIGS. 1 and 2, is generally advantageous for airbag inflation performance as such spacing may serve to minimize or avoid undesired concentration or focusing of the impingement of exiting inflation gas onto the associated airbag cushion material.

It will be appreciated by those skilled in the art that an airbag inflator assembly in accordance with the invention can provide operation performance in accordance with selected operating conditions as may be required or desired for particular inflatable restraint system installations and applications. More specifically, an airbag inflator of the invention can be actuated in a manner such that the quantity, supply and/or rate of inflation gas production can be appropriately varied, such as at the time of a vehicle crash or collision incident, to take into account one or more conditions of occupant presence. Such inflator performance adaptability can result from the subject inflator having two initiators at opposite ends of a propagation member, so that the reactive material can be actuated from one or both ends, either substantially simultaneously or at a selected time interval, of the propagation member.

Figure 3:
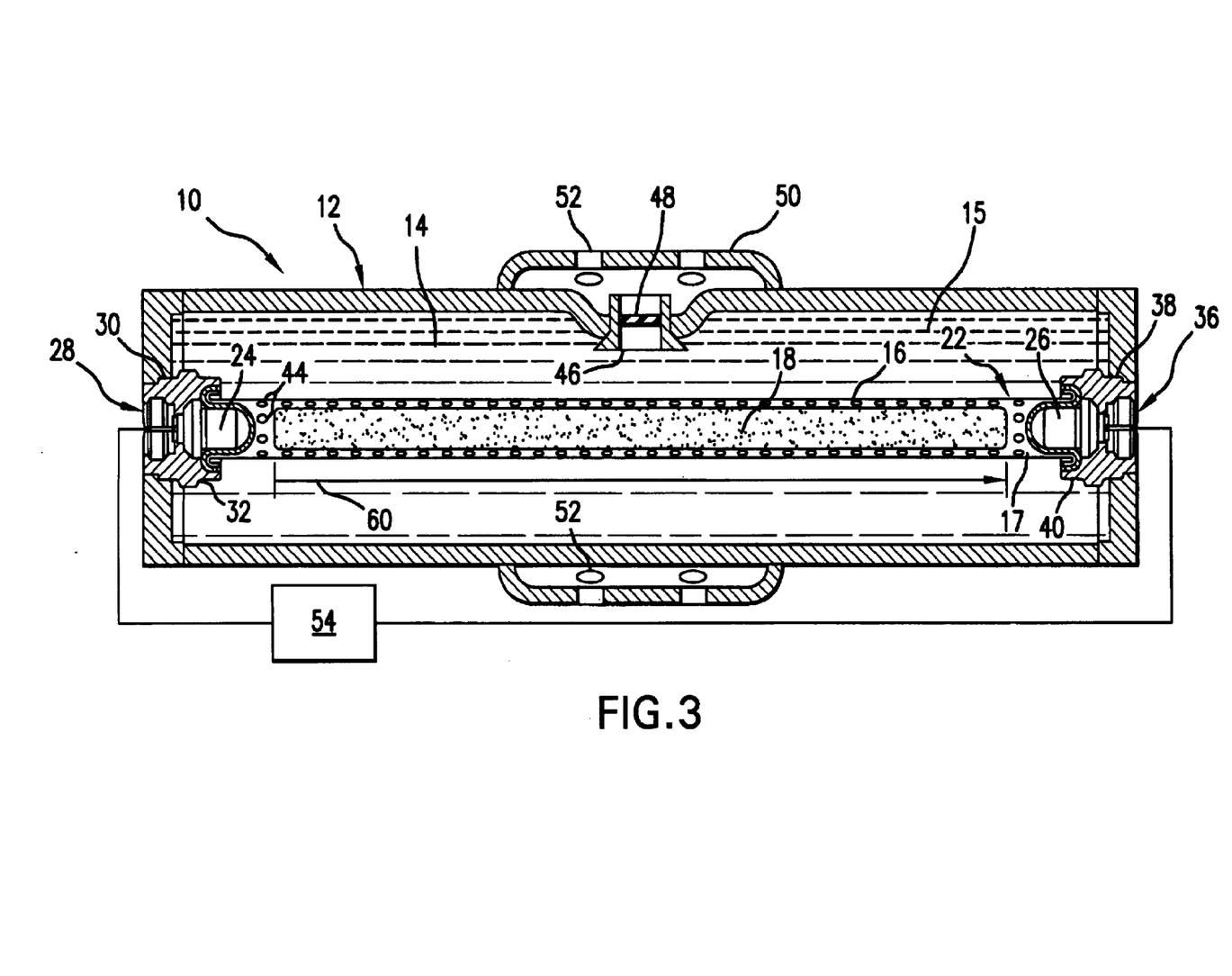
FIG. 3 shows a mode of operation of the airbag inflator and the associated control assembly of FIG. 1 in accordance with one embodiment of the invention.

In one embodiment of this invention, the control assembly 54 can provide a first reaction initiating signal to only the first initiator 24, such that the supply of reactive material 18 reacts from the first end 20 of the propagation member 16 toward the opposite second end 22. The reaction of the supply of reactive material 18 propagates as a chain-reaction through the propagation member 16 which resembles the burning of a fuse from one end of the fuse, the lit end, to the other. This mode of operation is illustrated in FIG. 3, which shows the airbag inflator 10 as shown in FIG. 1. FIG. 3 shows first arrow 60 which represents the direction and distance of the propagation of the supply of reactive material 18 through the propagation member 16 upon the control member 54 providing a first reaction initiating signal to the first initiator 24.

In the mode of operation illustrated in FIG. 3, the control assembly 54 provides a first reaction initiating signal to only the first initiator 24, and not to the second initiator 26. The supply of reactive material 18 propagates from the first end 20 of the propagation member 16 toward the opposite second end 22, as shown by the arrow 60 which extends from the first end 20 to the second end 22. When only the first initiator 24 initiates the supply of reactive material 18, the second initiator 26 is optional and can be replaced by a cap for sealing the second mounting opening 38, or the housing 12 can be produced without the second mounting opening 38.

In another embodiment of this invention, the control assembly 54 simultaneously provides a first reaction initiating signal to the first initiator 24 and a second reaction initiating signal to the second initiator 26 to initiate reaction of the supply of reactive material 18 within the propagation member 16. The supply of reactive material 18 is thus initiated at both the first end 20 and the second end 22 of the propagation member 16. The supply of reactive material 18 propagates from both ends of the propagation member 16 toward the opposite ends, and the two reactions will meet and have fully reacted the supply of reactive material 18 at about the midpoint of the propagation member 16. This mode of operation is illustrated in FIG. 4, which shows the airbag inflator 10 as shown in FIG. 1.

Figure 4:
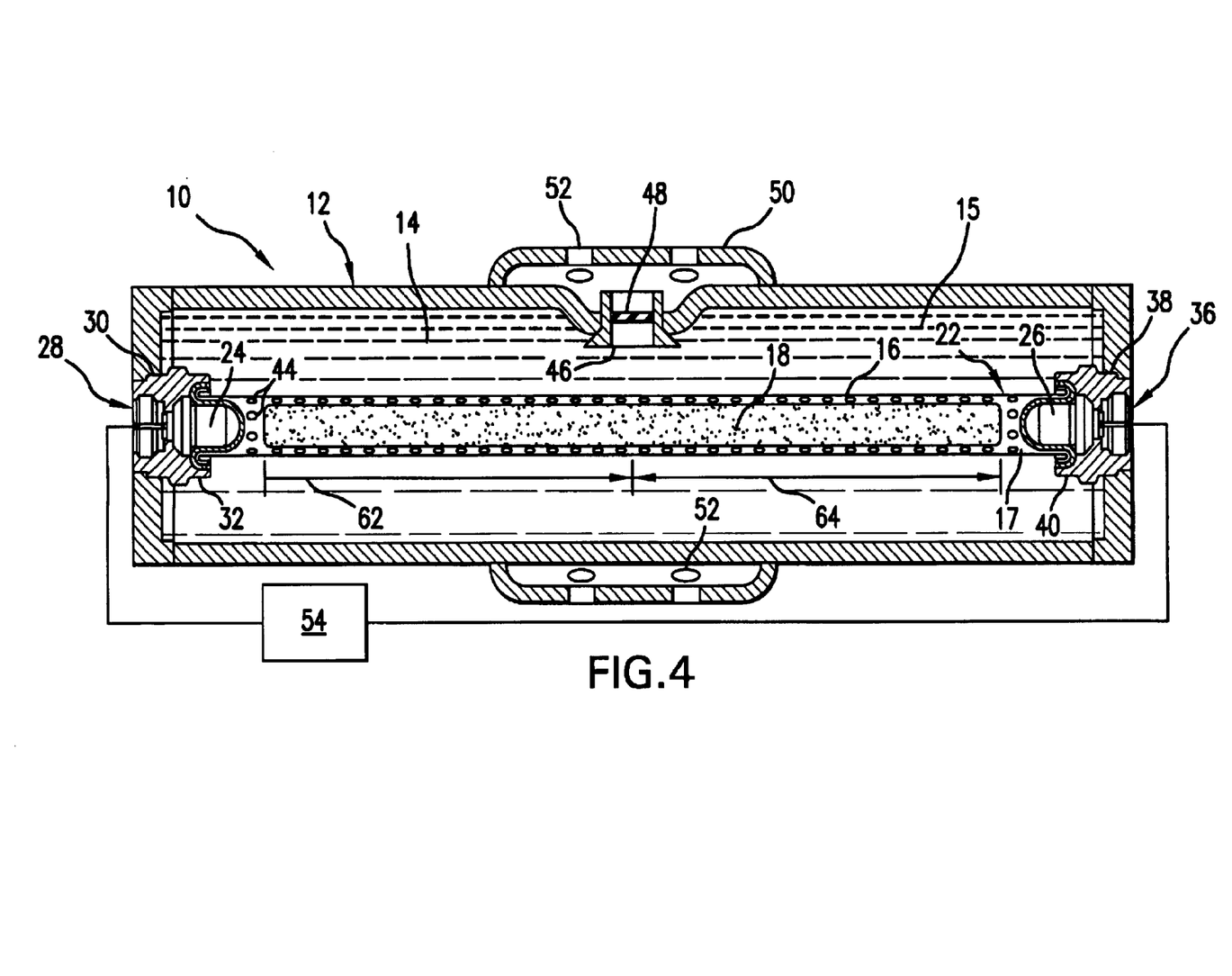
FIG. 4 shows a mode of operation of the airbag inflator and the associated control assembly of FIG. 1 in accordance with another embodiment of the invention.

FIG. 4 shows a first arrow 62 which represents the direction and distance of the propagation of the supply of reactive material 18 through the propagation member 16 upon the control member 54 providing a first reaction initiating signal to the first initiator 24. FIG. 4 also shows a second arrow 64 which represents the direction and distance of the propagation of the supply of reactive material 18 through the propagation member 16 upon the control member 54 providing a second reaction initiating signal to the second initiator 26. The first arrow 62 extends from the first end 20 to the midpoint of the propagation member 16. The second arrow 64 extends from the second end 22 to the midpoint of the propagation member 16. Thus, upon simultaneous first and second reaction signals, the first and second initiators 24 and 26 initiate opposite ends of the single supply of reactive material 18, which propagates within the propagation member 16 from both ends until the two reactions meet upon full reaction of the supply of reactive material at the midpoint of the propagation member 16. In the mode of operation shown in FIG. 4 the supply of reactive material 18 is fully reacted in about half the time as the mode of operation illustrated in the embodiment shown in FIG. 3. Increasing the reaction rate of the reactive material 18 in turn increases the rate of pressure increase within the storage chamber 14 and, thereby, the inflation rate of an associated airbag. It will therefore be appreciated how the same airbag inflator can be used to provide two different airbag inflation rates.

In yet another embodiment of this invention, the control assembly 54 provides a first reaction initiating signal to the first initiator 24 and a second reaction initiating signal to the second initiator 26 at a selected time interval subsequent to actuation of the first initiator to initiate reaction of the supply of reactive material 18 within the propagation chamber 16. This mode of operation is illustrated in FIG. 5, which shows the airbag inflator 10 but now with a first arrow 66 which represents the propagation of the supply of reactive material 18 through the propagation member 16 upon the control member 54 providing a first reaction initiating signal to the first initiator 24 and a second arrow 68 which represents the propagation of the supply of reactive material 18 through the propagation member 16 upon the control member 54 providing a second reaction initiating signal to the second initiator 26 at a selected time interval subsequent to actuation of the first initiator 24.

The first arrow 66 extends from the first end 20 past the midpoint of the propagation member 16 to about two-thirds of the length of the propagation member 16. The second arrow 64 extends from the second end 22 to about one third of the length of the propagation member 16. Thus, upon staggered first and second reaction signals at different time intervals, the first and second initiators 24 and 26 initiate opposite ends of the supply of reactive material 18 and the supply of reactive material 18 propagates within the propagation member 16 until the two reactions meet upon full reaction of the reactive material at a predetermined point of the propagation member 16. The rate of reaction of the supply of reactive material 18 illustrated in FIG. 5 falls between the reaction time of the embodiment of FIGS. 3 and 4.

Figure 5:
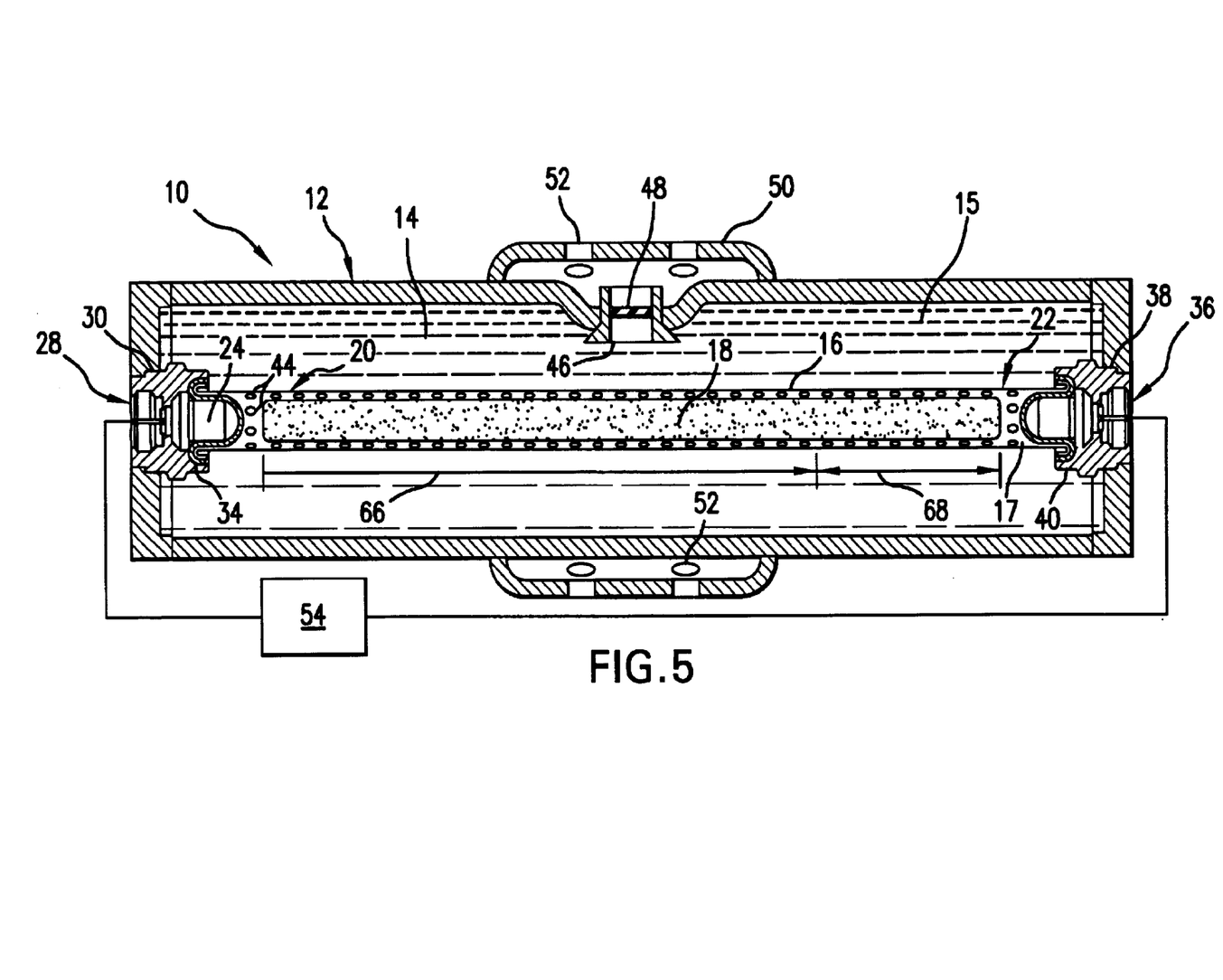
FIG. 5 shows a mode of operation of the airbag inflator and the associated control assembly of FIG. 1 in accordance with yet another embodiment of the invention.

As seen in the above embodiments shown in FIGS. 3–5, airbag inflators in accordance with the invention can provide several distinct inflation performance scenarios with a single inflator design. For illustrative purposes only, the embodiment of FIG. 3 shows a first mode of operation and a first reaction scenario, where only the first initiator 24 is actuated, and a supply of reactive material fully reacts, in a direction and length illustrated by the arrow 60, in 100 milliseconds. Thus a complete reaction of the reactive material takes 100 milliseconds, and maximum performance occurs at 100 milliseconds.

The embodiment of FIG. 4 shows a second mode of operation and a second performance scenario, where the first initiator 24 and second initiator 26 are actuated substantially simultaneously, and the supply of reactive material 18 propagates from both ends of the propagation member 16 until the two reactions meet upon full reaction of the supply of reactive material at the midpoint of the propagation member 16. As two simultaneously initiated reactions, shown by arrows 62 and 64, respectively, are consuming the reactive material, the full reaction of the supply of reactive material occurs in about half the time as the reaction illustrated in the embodiment of FIG. 3, or about 50 milliseconds. In other words, the reaction shown by the arrow 62 occurs in 50 milliseconds and the reaction shown by the arrow 64 occurs in the same 50 milliseconds, for a complete reaction, and maximum performance, in 50 milliseconds. Thus, the rate of inflation gas pressure increase in the storage chamber 14, and the rate of airbag inflation, is greater than with the reaction illustrated in FIG. 3.

The embodiment of FIG. 5 shows a third mode of operation and a third performance scenario, where the second initiator 26 is actuated at a selected time interval subsequent to actuation of the first initiator 24. For example, if the second initiator 26 has been actuated by the control assembly 54 at a point in time of 15 milliseconds after the first initiator 24 is actuated, the full reaction of the supply of reactive material occurs at the time the reaction reaches the distance shown by the arrow 66, or about 58 milliseconds. The reaction shown by the arrow 68 thus occurs in about 30 milliseconds. Therefore the rate of production of inflation gas and the rate of airbag inflation is between the rates obtained by the modes of operation illustrated in FIGS. 3 and 4.

Figure 6:
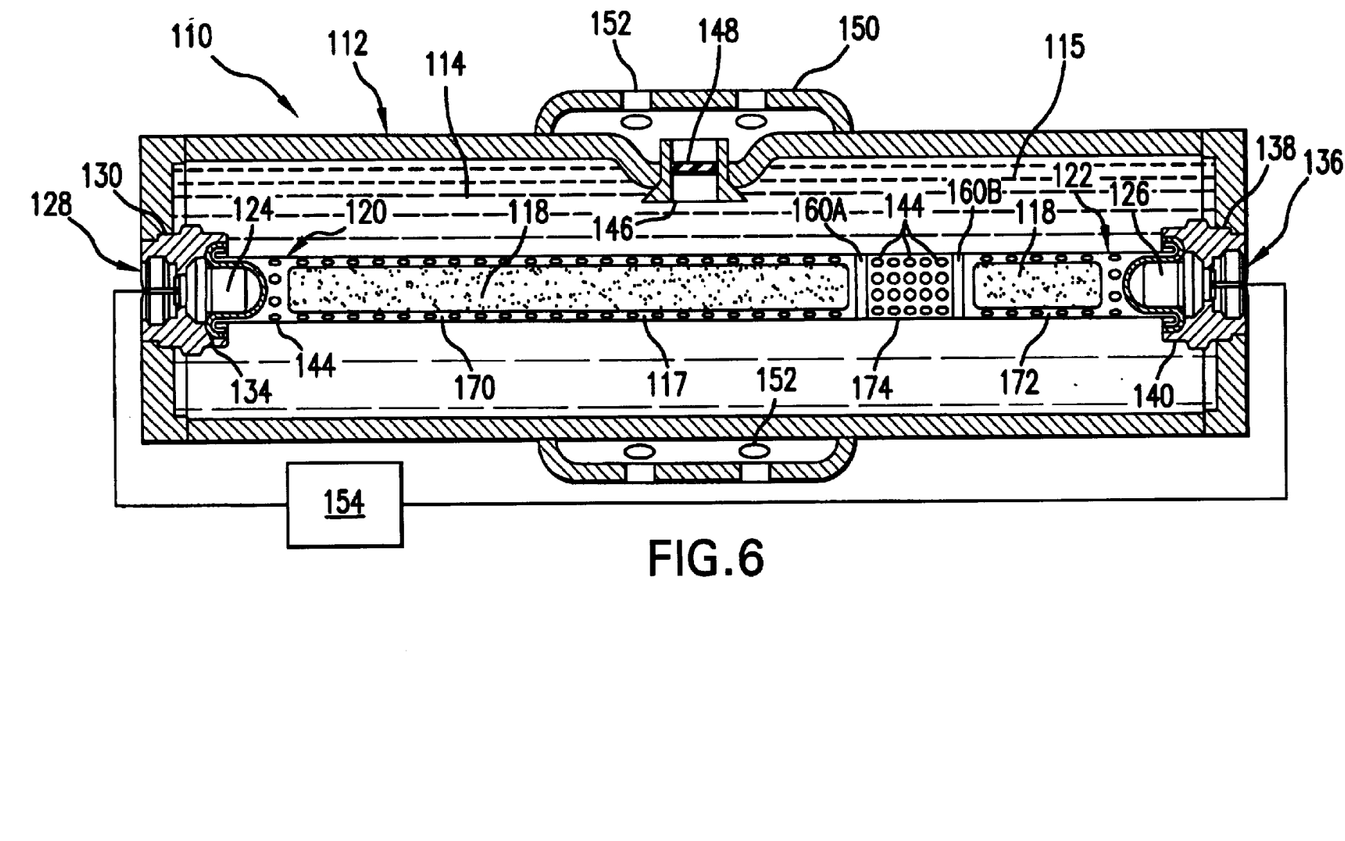
FIG. 6 is a partial cross-sectional side view of an airbag inflator and an associated control assembly in accordance with yet another embodiment of the invention.

FIG. 6 illustrates an airbag inflator, generally designated by the reference numeral 110, in accordance with another preferred embodiment of the invention. The airbag inflator 110 is generally similar to inflator 10, described above, and includes a housing 112 defining a storage chamber 114 that contains a supply of a gas source material 15 in a fluid form. The storage chamber 114 contains the propagation member 116. The propagation member 116 defines a propagation chamber 117 having a volume which contains a supply of a reactive material 118. The propagation member 116 has a first end 120 and a second end 122 and a plurality of gas exit holes 144. A first initiator 124 positioned at the first end 120 of the propagation member is in discharge communication with the supply of reactive material 118 and effective to initiate the reactive material 118. A second initiator 126 positioned at the second end 122 of the propagation member 116, opposite the first end 120 and the first initiator 124, is in discharge communication with the supply of reactive material 118 and effective to initiate the reactive material 118. The first and/or second initiators 124 and 126 can be actuated by a control assembly 154.

The first initiator 124 is included in a first initiator assembly, generally designated by the reference numeral 128, that is mounted to the housing 112 and partially within the storage chamber 114 via a first mounting opening 130. The first initiator assembly 128 includes the first initiator 124 and an initiator adapter or holder 132 whereby the first initiator assembly 128 is mounted to or mated with the housing 112. The second initiator 126 includes a similar configuration on the opposite side of the housing 112. A second initiator assembly 136 includes the second initiator 126 and a second initiator adapter or holder 140 whereby the second initiator assembly 136 is mounted to or mated with the housing 112.

The housing 112 includes at least one discharge opening 146, desirably centrally located, connecting the storage chamber 114 and an airbag. The discharge opening 146 includes a rupturable seal 148. The rupturable seal 148 normally seals the storage chamber 114 from the airbag, and it is rupturable to at least in part release the contents of the storage chamber 114. A thrust neutral diffuser element 150 having a plurality of diffuser openings 152 can be attached to the housing 112 surrounding the discharge opening 146.

The inflator 110 primarily differs from the inflator 10 in that the propagation member 116 contains two spaced-apart barrier members 160, individually designated 160A and 160B, respectively. The barrier members 160A and 160B are within the propagation chamber 117, and separate the propagation member 116 into three subchambers. A first subchamber 170 and a second subchamber 172 each include a supply of reactive material 118 and a third subchamber 174 is free of any reactive material. The barrier members 160A and 160B allow for a smaller total supply of reactive material and thus provide adaptive inflation gas output by containing the smaller supply of reactive material 118, as well as separating the smaller supply of reactive material 118 into a first amount to be initiated by the first initiator 124 and a second amount to be initiated by the second initiator 126, either simultaneously or at a selected time interval one after the other. The barrier members 160A and 160B can be placed anywhere within the propagation member 116 allowing for subchambers of various sizes, depending on need. The barrier members 160A and 160B desirably have a size and shape to conform to the inside of the propagation member 116. In one embodiment of this invention, the barrier members 160 are disks, such as formed of metal. The barrier members 160A and 160B can be maintained in position within the propagation member 116 by means known in the art, such as crimping the barrier member disks into place.

As will be appreciated by those skilled in the art, an inflator assembly in accordance with the invention may have a propagation member which includes only a single barrier member such as to separate the propagation member into two subchambers. In one version of such an embodiment, only one of the subchambers includes a supply of reactive material. Thus, in such an embodiment, the single barrier member provides a smaller propagation chamber for containing a smaller supply of reactive material in discharge communication with only one initiator. In another embodiment of this invention, both of the first and second subchambers include a supply of reactive material. The first initiator 124 is in discharge communication with the supply of reactive material 118 that is within the first subchamber and the second initiator 126 is in discharge communication with the supply of reactive material 118 that is within the second subchamber.

As will be appreciated by one skilled in the art, the use of barrier members allows for various subchamber configurations, which in turn allows for differing the size of the supply of reactive material 118 to be contained within the propagation member 116 and control over the quantity and rate of production of inflation gas using a single airbag inflator configuration. Therefore a standard adaptive airbag inflator can be used in a variety of vehicles and can be used to produce various selected airbag inflation rates, thereby simplifying and lowering the costs of design and production of both the airbag inflators and the vehicles themselves.

Thus, the invention provides airbag inflators that can provide various inflation gas outputs through a propagation member containing a supply of reactive material and at least two initiators. By actuating at least one of the first and second initiators, actuating both initiators simultaneously, or actuating a second initiator at a selected time interval subsequent to actuation of the first initiator, the same airbag inflator can provide different and selected inflation gas production rates.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

To hypothetically illustrate the adaptive output features of this invention, four identical test inflators having the general configuration shown in FIG. 1 could be actuated by an associated control assembly with four different time delays between actuation of the first and second initiators. The four inflators would each include an identical supply of reactive material in the propagation chamber. In Example 1, the first and second initiators would be actuated simultaneously, i.e., no time delay. In Example 2, the second initiator would be actuated 20 milliseconds after the first initiator, i.e., a time delay of 20 milliseconds. In Example 3, the second initiator would be actuated 40 milliseconds after actuation of the first initiator, i.e., a time delay of 40 milliseconds. In Example 4, only the first initiator would be actuated.

The inflation rates produced by the test inflators could then be determined by discharging each of the test inflators into a closed tank equipped with a pressure transducer.

Figure 7:
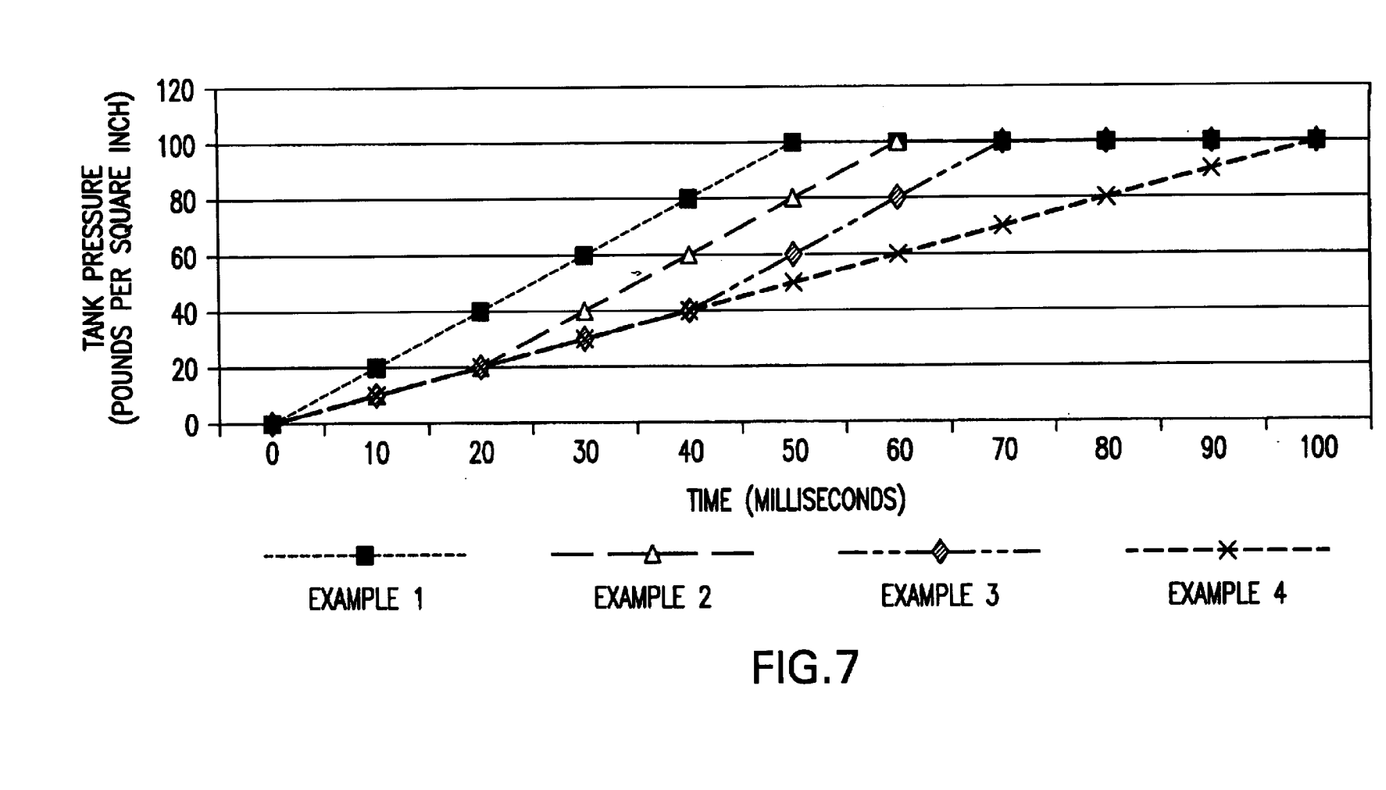
FIG. 7 is a graph illustrating the tank pressure versus time performance for the inflators of hypothetical Examples 1–4.

FIG. 7 is a graph of the tank pressure as a function of time for hypothetical Examples 1–4. The supply of reactive material for Example 4 would fully react in 100 milliseconds and result in a linear increase of the tank pressure from 0 to 100 pounds per square inch during that 100 milliseconds. Example 1 would also provide a linear increase in tank pressure, however in half the time of Example 4, or 50 milliseconds. Examples 2 and 3 would increase the tank pressure in time intervals between those of Examples 1 and 4, and provide a slower initial rate of tank pressure increase followed by an increase in the rate of tank pressure increase upon actuation of the second initiator. The inflators of Examples 1–4 would result in an increase in tank pressure from 0 to 100 pounds per square inch in 50, 60, 70, and 100 milliseconds, respectively, using the same inflator design having the same quantity of reactive material. Thus Examples 1–4 and FIG. 7 illustrate that the inflators of this invention can provide inflation gas, such as for inflating an airbag, at various selected rates while employing a single inflator configuration.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag inflator, comprising:
    a housing defining a storage chamber containing contents including a supply of a gas source material in a fluid form, the gas source material selected from the group consisting of nitrous oxide, inert materials and combinations thereof;
    a propagation member contained at least in part within the storage chamber, the propagation member defining a propagation chamber having a volume containing a supply of a reactive material that reacts to at least produce heat, the propagation member having a first end and a second end, the propagation member including a plurality of gas exit holes;
    a first initiator at the first end of the propagation member and in discharge communication with the supply of reactive material and effective to ignite the reactive material; and
    a second initiator at the second end of the propagation member and in discharge communication with the supply of reactive material and effective to ignite the reactive material.

2. The airbag inflator of claim 1 wherein upon reacting the reactive material also produces at least one gaseous species.

3. The airbag inflator of claim 1 additionally comprising a discharge opening connecting the storage chamber and an airbag, the discharge opening including a rupturable seal normally sealing the storage chamber from the airbag and rupturable to at least in part release the contents of the storage chamber.

4. The airbag inflator of claim 3 wherein the discharge opening is centrally located on a side of the housing.

5. The airbag inflator of claim 4 additionally comprising a thrust neutral diffuser element surrounding the discharge opening, the thrust neutral diffuser element including a plurality of diffuser openings.

6. The airbag inflator of claim 5 wherein the thrust neutral diffuser element extends around the housing.

7. The airbag inflator of claim 1 additionally comprising a control assembly in operational control communication with the first and second initiators.

8. The airbag inflator of claim 7 wherein the control assembly provides a first reaction initiating signal to the first initiator and a second reaction initiating signal to the second initiator at a selected time interval subsequent to actuation of the first initiator to initiate reaction of the reactive material within the propagation member.

9. The airbag inflator of claim 7 wherein the control assembly simultaneously provides a first reaction initiating signal to the first initiator and a second reaction initiating signal to the second initiator to initiate reaction of the reactive material within the propagation member.

10. The airbag inflator of claim 1 wherein the reactive material is a pyrotechnic material.

11. The airbag inflator of claim 1 wherein the gas source material comprises nitrous oxide.

12. The airbag inflator of claim 1 additionally comprising at least one barrier member within the propagation member, wherein the at least one barrier member separates the propagation member into at least two subchambers.

13. The airbag inflator of claim 12 wherein the barrier member includes a disk.

14. The airbag inflator of claim 13 wherein the disk is crimped into place.

15. The airbag inflator of claim 1 additionally comprising two barrier members, wherein the two barrier members enclose a subchamber free of reactive material.

16. A method of generating inflation gas via an airbag inflator which includes:

a housing defining a storage chamber containing contents including a supply of a gas source material in a fluid form, the gas source material selected from the group consisting of nitrous oxide, inert materials and combinations thereof;

a propagation member contained at least in part within in the storage chamber, the propagation member defining a propagation chamber having a volume containing a supply of a reactive material that reacts to at least produce heat, the propagation member having a first end and a second end, the propagation member including a plurality of gas exit holes;

a discharge opening connecting the storage chamber and an airbag, the discharge opening including a rupturable seal normally sealing the storage chamber from the airbag and rupturable to at least in part release the contents of the storage chamber;

a first initiator at the first end of the propagation member and in discharge communication with the supply of reactive material and effective to ignite the reactive material; and a second initiator at the second end of the propagation member and in discharge communication with the supply of reactive material and effective to ignite the reactive material;

the method comprising the step of actuating at least one of the first and second initiators.

17. The method of claim 16 wherein both the first and second initiator devices are actuated.

18. The method of claim 17 wherein the first and second initiators are actuated substantially simultaneously.

19. The method of claim 17 wherein the second initiator is actuated at a selected time interval subsequent to actuation of the first initiator.

20. The method of claim 16 additionally comprising increasing a gas pressure within the storage chamber and rupturing the rupturable seal.

21. The method of claim 20 additionally comprising igniting the reactive material to produce at least heat, wherein the heat produced by the reactive material heats the supply of the gas source material to increase the gas pressure in the storage chamber.

22. The method of claim 16 wherein the gas source material comprises nitrous oxide.

* * * * *